Aug. 16, 1932.  L. T. FREDERICK  1,872,134
METHOD AND APPARATUS FOR ASSEMBLING DISKS
Filed Jan. 18, 1928  4 Sheets-Sheet 1
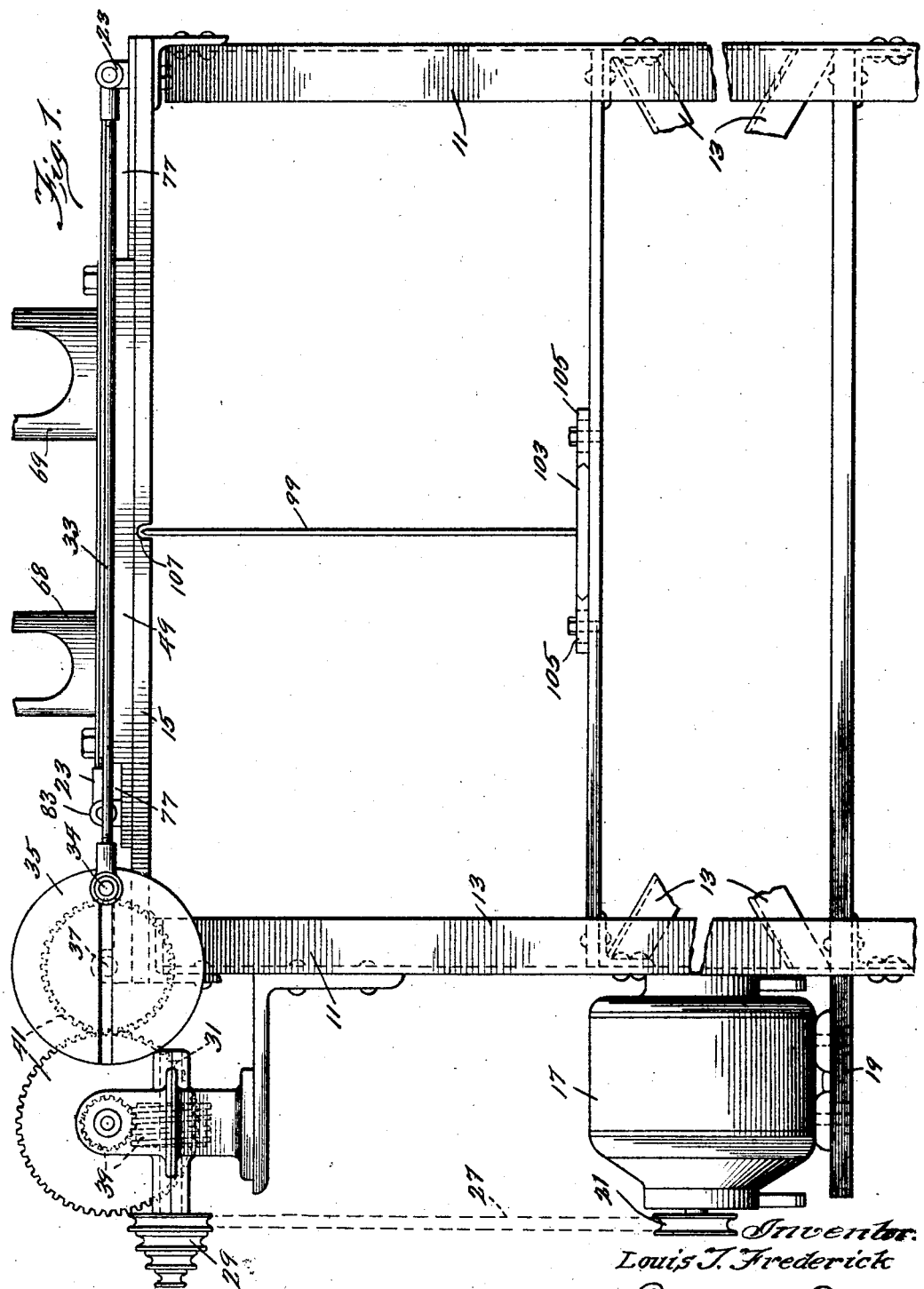
Inventor.
Louis T. Frederick
By Cheever & Cox
Attys

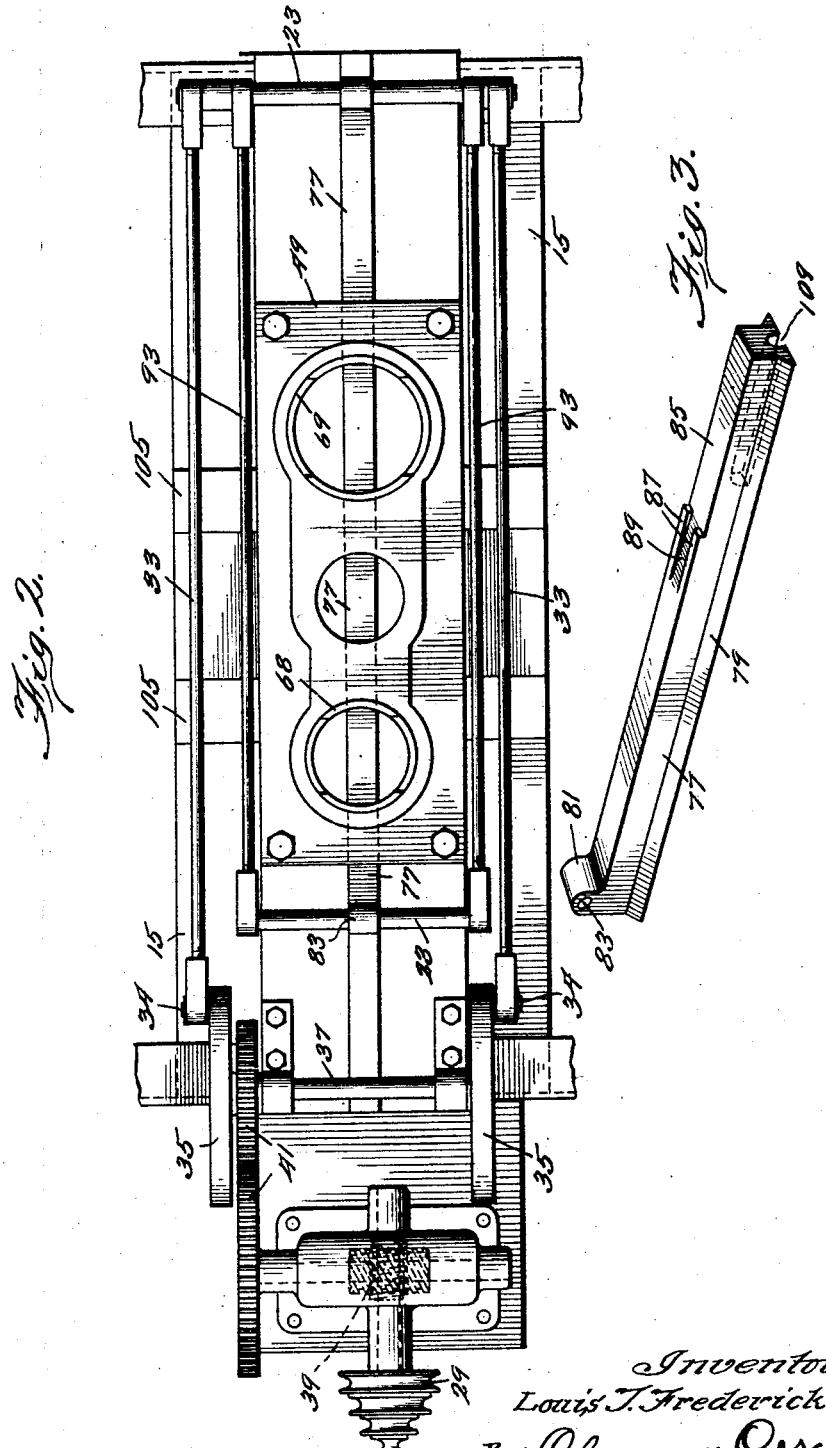

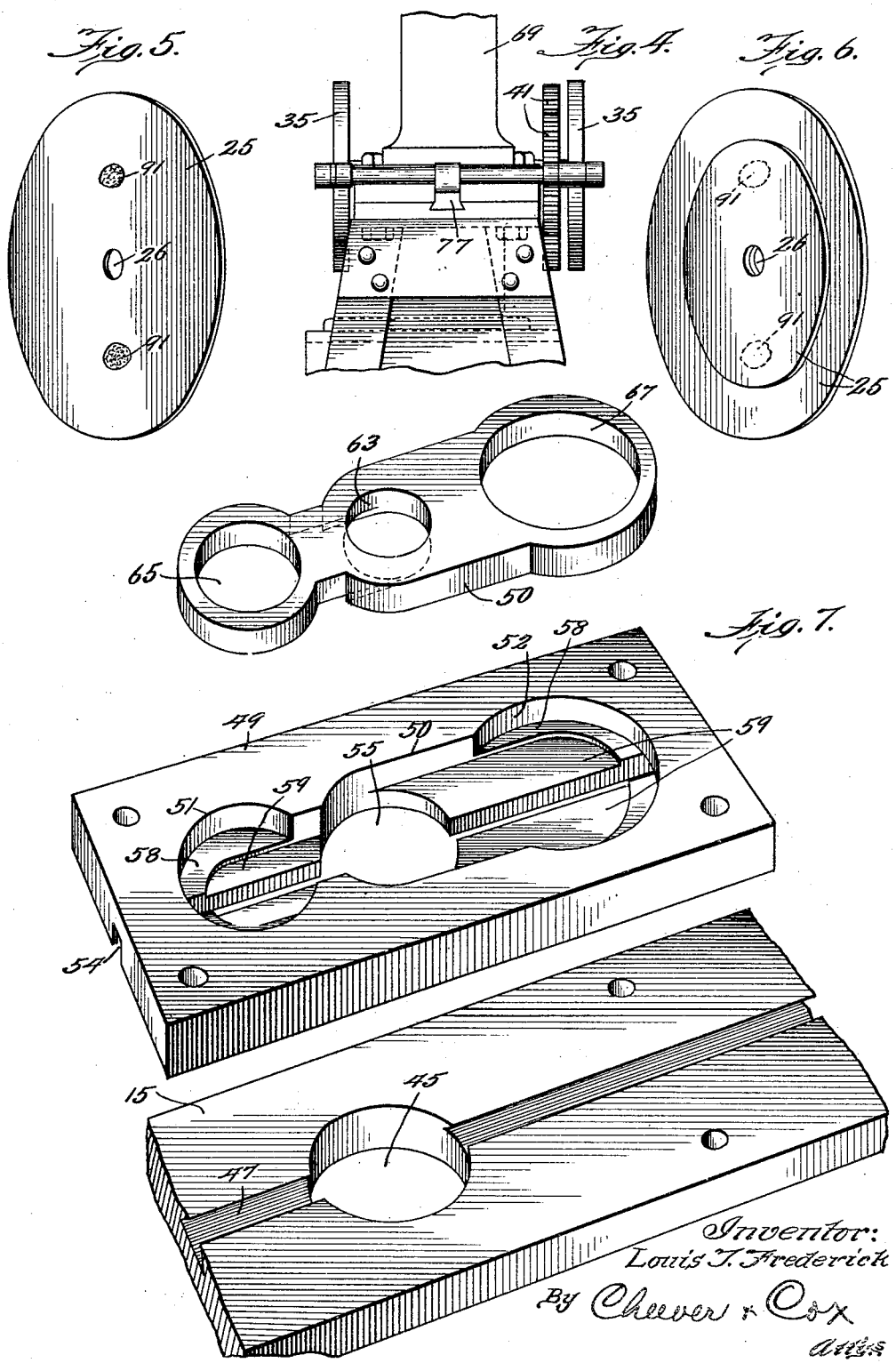

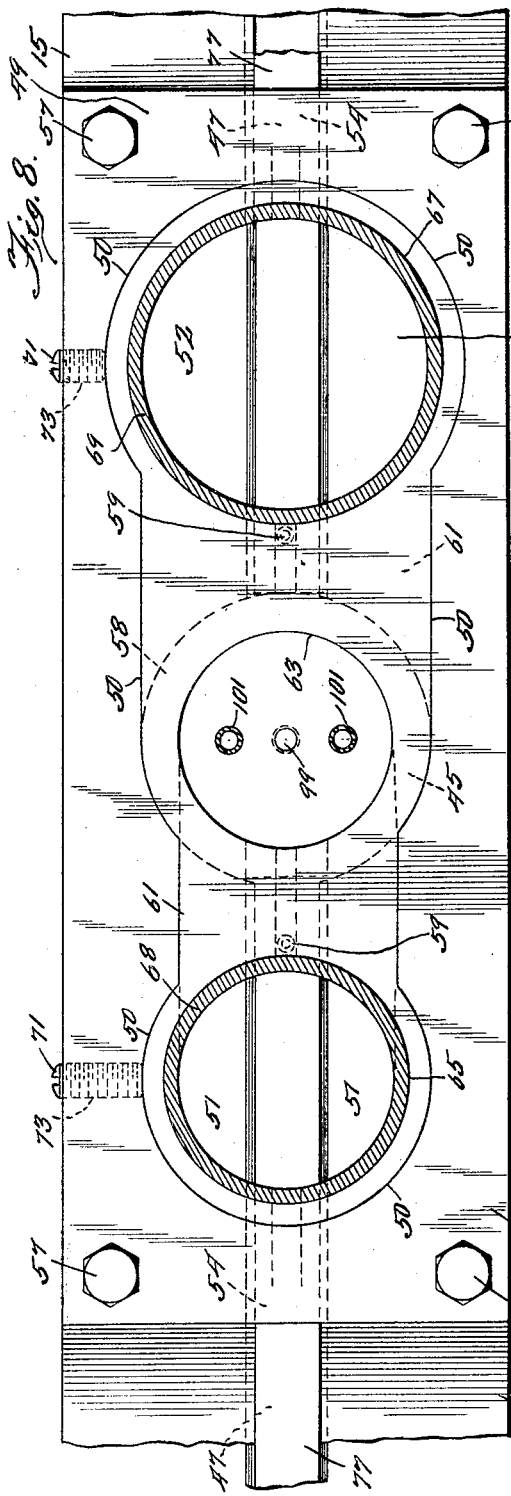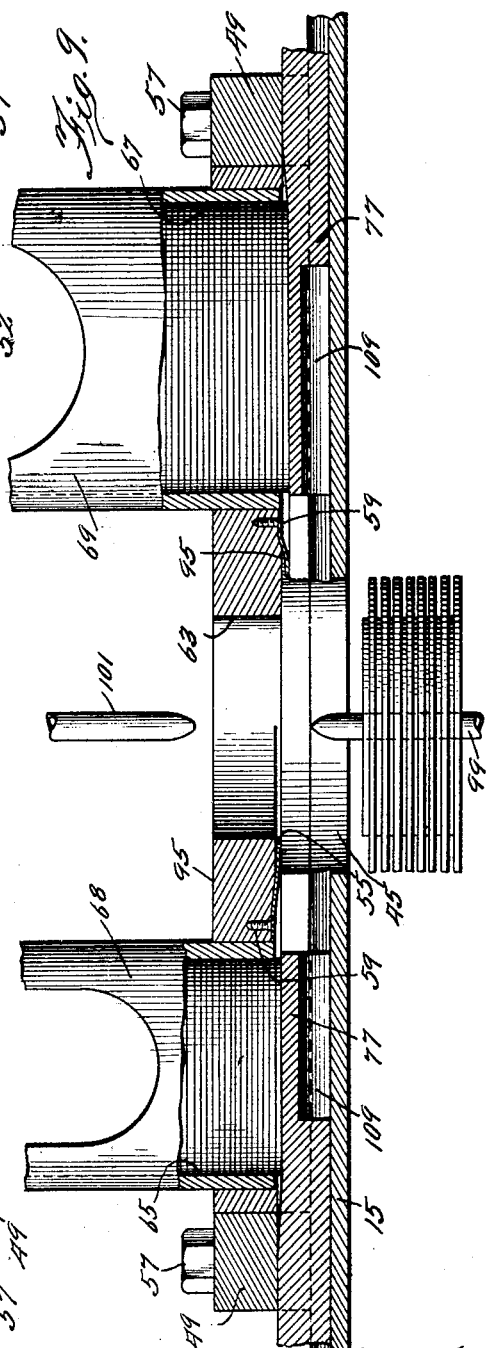

Patented Aug. 16, 1932

1,872,134

UNITED STATES PATENT OFFICE

LOUIS T. FREDERICK, OF VALPARAISO, INDIANA, ASSIGNOR, BY MESNE ASSIGNMENTS, TO CONTINENTAL DIAMOND FIBRE COMPANY, OF NEWARK, DELAWARE, A CORPORATION OF DELAWARE

METHOD AND APPARATUS FOR ASSEMBLING DISKS

Application filed January 18, 1928. Serial No. 247,672.

My invention relates to a method and apparatus for assembling discs in concentric adjacent relationship and while I have hereinafter described a preferred embodiment in which I have applied the principles of the invention particularly to the assembling of mica discs of unequal diameter to form laminated blanks adapted to be fed to a closing mould, to be thereby pressed to form articles such as mica commutator rings shown in my co-pending application Serial #120,820 filed April 17, 1927, my invention is not limited to the assembly of blanks for any particular purpose but contemplates broadly the provision of means for assembling laminated blanks, comprising concentrically arranged discs, for any purpose.

In my co-pending application Serial #147,710 filed November 11, 1926, I have illustrated a centering die on closing mould adapted to receive a plurality of mica discs, center the discs in the die and shape the same to form commutator rings. It will be readily appreciated that where such an article is made by pressing mica discs in a closing mould, considerable time will be lost if the discs have to be separately placed in the die by hand. By assembling the discs into a laminated blank comprising superposed discs arranged in concentric alignment, and feeding the blanks to the die, the manufacturing process may be simplified and the costs thereof substantially reduced. Moreover in feeding discs to a die by hand, the operator may omit some of the discs in which case the resulting product will be defective.

One object of the invention is to provide an apparatus for mechanically assembling a plurality of discs in concentric and adjacent relationship to provide a laminated blank.

Another object of the invention is the elimination of waste, both of time and material, which is effected by the device of my invention.

Another object of the invention is to reduce the ultimate cost of manufacturing articles formed from laminated blanks.

Another object of the invention is to provide a machine for assembling discs of unequal size in concentric relationship.

Another object of the invention is to provide a means for assembling and securing discs of unequal size in concentric relationship to form a unitary laminated blank.

Still another object of the invention is to provide a laminated blank adapted to be fed into a shaping machine as a unit.

Numerous objects and advantages will be apparent as the invention is more fully understood from the following description, which taken in connection with the accompanying drawings discloses a preferred embodiment of the invention.

Referring to the drawings:

Figure 1 is a side elevation view of a device embodying my invention;

Figure 2 is a plan view of the device illustrated in Figure 1;

Figure 3 is a perspective view of a slide member element of the device illustrated in Figure 1;

Figure 4 is an end elevation view of a portion of the device illustrated in Figure 1 taken from the right.

Figures 5 and 6 are respectively perspective views of an individual disc and a laminated blank as assembled by the device of my invention;

Figure 7 is a perspective view showing the formation of parts of the device.

Figure 8 is an enlarged view of a part of the device as illustrated in Figure 2; and Figure 9 is a cross sectional view taken substantially along line 8—8 in Figure 7.

To illustrate my invention I have shown on the drawings a preferred embodiment especially adapted to assemble two circular discs of unequal size in concentric contiguous relationship to provide a laminated blank such as may be conveniently fed as a unit to a mould of the type illustrated and described in my above mentioned co-pending application, Serial No. 147,710 filed November 11, 1926, but it will be apparent that the scope of this invention is not limited to a machine for assembling blanks comprising two discs only, or circular discs only, or discs of unequal size, my invention contemplating a machine for aligning discs of any shape or size to form a laminated blank for any purpose.

The illustrated embodiment comprises various elements which are supported upon a main frame 11, formed from angle irons 13, which supports a bed plate 15 on which the elements of the assembly device are mounted. A driving motor 17, which may be of any convenient type, is secured to the frame 11 by means of a support member 19. The motor has a fly wheel or pulley 21 and drives the moving parts of the assembly device, the pulley 21 being connected by means of a belt 27 to a stepped pulley 29 mounted on a shaft 31 which operates through reduction gears 39 and a train of gears and pinions 41 to drive a shaft 37, suitably journaled in bearings mounted in the bed plate 15 and carrying fly wheels 35 at its opposite ends. The fly wheels 35, in turn, impart reciprocating motion to a cross head 23 by means of connecting rods 33 engaging the cross head and pivotally mounted on crank pins 34 secured in the fly wheels 35. The shaft 31 and the reduction gears 39 are all suitably supported in the main frame 11, and the cross head is arranged to reciprocate along the bed plate 15.

A type of laminated blank formed by the operation of my assembly device is illustrated in Figure 6 of the drawings, and comprises, in the present instance, two circular discs 25 of unequal size and having each a centrally disposed opening 26. The discs are carried, before assembly, in magazines 68 and 69 which comprise cylindrical tubes each having an interior diameter slightly larger than that of the discs which they contain. In the embodiment illustrated, the larger magazine is designated by the reference numeral 69. These magazines are supported in a grooved plate 49 suitably secured, by means of bolts 57, to the base plate 15, the magazines being arranged in position to drop discs into channels 59 formed by recessing the plate 45 immediately under the lower ends of the magazines. These channels lead to an assembly chamber comprising a centering aperture 55 formed through the plate 45 and an aligned opening 45 formed through the bed plate 15 immediately under the opening 55. The cross head comprises a frame having disc carriers 77 fastened thereto and adapted to slide in morticed grooves 47 formed longitudinally in the upper surface of the plate and centrally beneath the magazines. These carriers have upper portions operating in grooves formed in the lower surface of the plate 45 and are adapted to engage a disc dropped into the channel from a magazine and carry such disc to the centering aperture. Upon retraction of the disc carrier, a spring catch 95 prevents the retraction of the disc therewith, and the disc remains in the centering aperture and drops onto a spike 99 arranged in position to enter the aperture 26 of the disc. Discs are carried alternately from the magazines to the assembly chamber and are deposited on the spike 99. Means is provided for depositing drops of suitable adhesive material, such as shellac, upon the upper surface of the larger of the discs 25 immediately before it is dropped onto the spike 99 by the retraction of the carrier. When the next succeeding disc is dropped on the larger disc so treated, the adhesive material so deposited will secure the discs together and the spike passing through the aperture 26 of adjacent discs, secures them in concentric alignment until the adhesive material hardens and secures them in position. The aperture 55 has a diameter slightly larger than that of the disc carried by the magazine 69 and when a dics is pushed along the channel 59 into this aperture, the wall thereof opposite the opening of the channel engages the edge of the disc and centers it over the spike 99. In order to permit this, the channels leading from the magazines are not arranged in the same plane, but the channel leading from the magazine 68 is offset above the channel from magazine 69. In order to center the smaller disc over the spike 99, the centering aperture 55 is restricted opposite the opening of the smaller channel to provide centering aperture 63 having a diameter of proper size to receive and center the smaller disc.

For convenience in manufacture, I have formed the plate 49 in two parts, the lower part having a recess or cut-out depression 50 and the upper part comprising a template 61 formed to seat in this recess and having apertures 65 and 67 for receiving the lower ends of the magazine tubes 68 and 69 respectively. The template provides a cover for the grooves 59 which are formed in the bottom of the cut-out portion 50, and is supported in place on shoulders 58 which are formed at the bottom of the cut-out 50 around the edges of the grooves 59. The template 61 is secured in the plate 49 by means of set screws 71 carried in tapped holes 73 formed in the plate 49. The restricted centering aperture 63 also is formed in the template 61. The cut-out depression 50 formed in the upper surface of the plate comprises two spaced circular portions 51 and 52 of unequal size. The circular aperture 55 is formed through the plate substantially midway between the spaced depressions 51 and 52 which are each connected with the circular aperture by means of the grooves 53, the groove between the depression 51 and the aperture 55 having a width slightly greater than the diameter of the smaller discs, and the depression 52 being connected with the aperture 55 by a groove, the diameter of which is slightly greater than the diameter of the larger discs.

The depression 51 is shallower than the depression 52 by an amount slightly greater than the thickness of the discs 25, and the bottom of the channels, having a width slightly greater than the diameters, respectively, of the smaller and larger discs, extend from the aperture 55 inwardly into the depressions 51 and 52. The formation of these channels provide ledges or shoulders 58 at the edges of depressions 51 and 52, which shoulders are cut away at the side of the depression adjacent the aperture 55. The plate 49 is provided with a groove 54 substantially rectangular in cross section and extending longitudinally across the lower surface of the plate. This groove crosses the aperture 55 diametrally and extends from the bottom face of the plate upwardly to the bottom of the depression 51, at one side, and upwardly to the bottom of the depression 52 at the other side of the plate.

The third plate or template 61 has a peripheral contour conforming with the outline of the depression 50 and is adapted to seat therein. The template has a thickness at one end equal to the depth of the depression 52 and is cut away at the other end to snugly fit into the shallower arm 51 of the cut-out 50, the ends of the template resting upon the shoulders 58. The larger magazine 69 is adapted to fit into an aperture 67 formed in one end of the template while the smaller magazine is similarly fitted at its lower or discharge end into an aperture 65 formed in the other end of the template. The lower ends of the magazine tubes rest upon the shoulders 58. The groove 54 of the plate 49 registers with the morticed groove 47 at the base plate 15 and the aperture 55 of the former aligns with the aperture 45 of the latter.

The disc carriers 77 comprise retracting slides secured to the cross head 23 by means of a shaft 75 which passes through a hole 83 formed in a lug 81 at the butt end of the slide. Each slide has a bevelled portion 75 adapted to seat in the morticed groove of the plate 43 and an upper portion adapted to slide in the groove 54 of the plate 49. The upper surface of this portion is cut away at the forward end of the slide to provide a disc receiving seat 85. The upper surface of the disc is also grooved out to form an inclined plane surface 89 between the upper surface of the slide and the disc seat 85. This surface is formed centrally of the slide to provide shoulders 87 at one end of the disc seat and on each of the inclined plane surfaces.

Figure 8 of the drawings shows a detailed cross sectional view of the parts in assembled position. In operation the slides 77 reciprocate beneath the magazines 68 and 69 which each deposit discs in the channels 59, when the slides are fully retracted. As a slide moves toward the aperture 55, the shoulders 87 engage behind the deposited disc and move it along the channel into the main assembly chamber which comprises the centering apertures 55 and 63, the larger disc engaging finally in the aperture 35 and the smaller disc in turn engaging in the aperture 63, the sides of which apertures align the discs directly over the spike 99. Resilient springs 95 are secured to the lower surface of the template 61 by means of screws 97 as shown in Figure 8. These springs allow the discs to be slid along the channels 59 into the assembly chamber and prevent withdrawal of the same when the disc carriers are retracted, the springs sliding along the inclined planes 89 between the shoulders 87 in order to accomplish this function. Upon retraction of a slide, the disc falls and is secured upon the spike 99 which passes through the aperture 26 of the disc. In order to secure adjacent discs in aligned relationship, I have provided means for depositing a drop of adhesive material on a disc while it is aligned in the assembly chamber and before it is dropped on the spike by the retraction of the slide 77. These means comprise an "inking" device similar to the one illustrated and described in my co-pending application Serial No. 247,671 filed of even date herewith, the discharge nozzles 101 of which are shown arranged immediately above the opening 63 in position to discharge drops of adhesive into the assembly chamber. The mechanism of the inking device is suitably controlled by the movement of the cross head 23 to deposit two drops 91 of shellac or other suitable adhesive material upon a disc, substantially as illustrated in Figure 5 of the drawings, when the disc is in position within the aligning aperture.

The spike 99 is mounted in a carriage 103 slideably secured in lateral grooved members 105 suitably mounted in the frame 11 in position to allow the spike to be drawn out from beneath the assembly chamber, the base plate 15 being slotted at 107 to permit the tip of the spike to slide out. The disc carriers 77 also are each provided with a groove 109 in their bottom surfaces to allow them to slide freely over the spike tip when projected into the assembly chamber.

It will be apparent that numerous changes may be made in the form, structure and arrangement of the parts, herein illustrated and described, without departing from the spirit and scope of this invention and the devices may be arranged to accommodate and align flat elements having other peripheral configurations than the circular discs specifically described, the disclosure being herein merely of a preferred form of my invention.

What I claim as new and desire to secure by Letters Patent of the United States is:

1. In a device of the class described, a frame, a plurality of magazines arranged in said frame, retractor means for drawing a disc from said magazine to an assembly chamber in said frame, means controlling said retractor whereby discs may be drawn from said magazines to said assembly chamber in a definite sequence, and means for receiving assembled discs from said assembly chamber.

2. In a device of the class described, a frame, a plurality of magazines arranged in said frame, a common assembly point in said frame, means for ejecting discs from said magazines to said assembly point, and means for receiving said discs from said assembly point.

3. In a device of the class described, a frame, a plurality of magazines arranged in said frame, a common assembly point formed in said frame, means for ejecting a disc from any one of said magazines to said assembly point means for receiving said disc in relatively aligned position from said assembly point and means for depositing adhesive material upon said ejected disc at said assembly point, in order to secure the disc to the disc next ejected to said point.

4. In a device of the class described, a frame, a plurality of disc containing magazines arranged in said frame, means for ejecting a disc from any of said magazines to an assembly point in said frame, means for ejecting a disc from another of said magazines and superposing said ejected disc in concentric alignment upon said first disc and means for removing said discs from said assembly point.

5. In a device of the class described, a frame, a plurality of disc containing magazines arranged in said frame, means for ejecting discs from said magazines and superposing said ejected discs in concentric alignment.

6. In a device of the class described, a frame, a plurality of disc containing magazines arranged in said frame, means for ejecting a disc from said magazines and superposing said ejected discs in concentric alignment and means for securing said discs in aligned position.

7. In a device of the class described, a frame, disc containing magazines arranged in said frame, a common assembly point formed in said frame, channels formed in said frame and adapted to receive discs from said magazines, and means for moving a disc along said channel to said assembly point.

8. In a device of the class described, a frame, disc containing magazines arranged in said frame, a common assembly point formed in said frame, channels adapted to receive a disc from a magazine, formed in said frame and opening into said channel, and a reciprocating carrier for moving a disc along said channel and into said assembly point.

9. In a device of the class described, a frame, disc containing magazines arranged in said frame, an assembly chamber formed in said frame, channels adapted to receive a disc from a magazine, arranged in said frame and extending from said magazines to said assembly chamber, co-operating means acting in each channel for moving the discs to said chamber and means preventing the retraction of the discs in said channels.

10. In a device of the class described, a frame, an assembly chamber, disc magazines carried in said frame, means for feeding discs to said chamber from said magazines, a removable carrier in said assembly chamber on which the aligned discs may be deposited for removal from the chamber.

11. In a device of the class described, a frame, an assembly chamber, disc magazines carried in said frame, means for feeding discs to said chamber from said magazines, a removable carrier in said assembly chamber on which the arranged discs may be deposited in relatively aligned position, said carrier comprising a member adapted to engage a cut-out formed in said discs.

In witness whereof, I have hereunto subscribed my name.

LOUIS T. FREDERICK.